United States Patent [19]
Payne

[11] 3,975,734
[45] Aug. 17, 1976

[54] SYNTHETIC APERTURE RADARS INCLUDING MOVING TARGET INDICATION

[75] Inventor: Robert William Payne, Hillingdon, England

[73] Assignee: EMI Limited, Hayes, England

[22] Filed: Aug. 7, 1974

[21] Appl. No.: 495,495

[30] Foreign Application Priority Data
Aug. 21, 1973 United Kingdom............... 39649/73

[52] U.S. Cl................................ 343/7.7; 343/5 CM
[51] Int. Cl.²........................................... G01S 9/42
[58] Field of Search........................... 343/5 CM, 7.7

[56] References Cited
UNITED STATES PATENTS

| | | | |
|---|---|---|---|
| 3,388,398 | 6/1968 | Kratzer et al. | 343/7.7 |
| 3,680,103 | 7/1972 | Houser | 343/5 CM |
| 3,720,950 | 3/1973 | Vehrs, Jr. | 343/7.7 |
| 3,735,400 | 5/1973 | Sletten et al. | 343/5 CM |
| 3,787,840 | 1/1974 | Dotson | 343/7.7 |
| 3,787,851 | 1/1974 | Hughes | 343/7.7 |

*Primary Examiner*—Maynard R. Wilbur
*Assistant Examiner*—S. C. Buczinski
*Attorney, Agent, or Firm*—Fleit & Jacobson

[57] ABSTRACT

There is disclosed a synthetic aperture radar arranged to survey a region from a mobile location. Radar pulses are transmitted in sets, the pulses from each set being transmitted from congruent positions. The returned echoes of the pulses of each set are then compared to substantially remove signals relating to static targets. The signals relating to the doppler shifts of returns from moving targets are processed by a correlator covering a frequency band sufficient to include such signals or further signals indicative of them and produced as a result of the sampling nature of the pulsed radar.

4 Claims, 11 Drawing Figures

SYNTHETIC APERTURE RADARS INCLUDING MOVING TARGET INDICATION

The present invention relates to radar apparatus, and relates especially, though not exclusively, to a moving target indicator incorporated in a sideways looking coherent radar for an aircraft.

A known principle for enhancing the resolution of a sideways looking radar for an aircraft utilises a series of receiving aerial positions at which signal returns from a remote target are received as the aircraft moves along its flight path, to generate an effective or synthetic receiving aerial aperture which may be considerably larger than the actual aperture of the receiving aerial mounted on the aircraft.

Considering the actual aperture to be moving past a stationary point target, the radar returns therefrom will be imparted with a doppler frequency component due to the relative motion between the aperture and target, the doppler frequency varying as a negative linear frequency sweep with time if the aircraft is assumed to fly past the target at constant velocity. The maximum doppler frequency depends upon the velocity of the aircraft relative to the target. In order that the various signal returns across the synthetic aperture may be correlated, they are applied to correlating means, for example of the kind in which the signal returns are first stored and then groups of the returns are multiplied by respective weighting factors to provide a focused output signal. Each signal return has to be multiplied by a different weighting factor for successive correlations, and one way of performing the correlation is to use a transversal filter, in the form of a parallel output shift register, with the required weighting factors applied to each output. The correlator weighting function also determines a bandwidth for the correlator.

It has been proposed to form a moving target indicator (MTI) radar utilizing such a correlation over a synthetic aperture. However, the frequencies of the doppler component imparted to radar returns from a moving target vary with target velocity and may extend over a frequency range considerably greater than that covered by the correlating means. Thus, in order to detect a moving target, it has been proposed to utilise a series of correlating means each covering a part of the range of the doppler frequency excursions.

According to the invention there is provided a synthetic aperture radar system for surveying a region from a moving location including an aerial having a plurality of spaced sections, a transmitter adapted to cooperate with said aerial to project a series of emitted pulses towards said region, a receiver adapted to cooperate with said aerial to receive corresponding echo pulses relating to targets in said region, the arrangement being such that a first emitted pulse is projected from, and corresponding first echo pulses are received at, at least one of said sections, a second emitted pulse is projected from, and corresponding second echo pulses are received at, at least one other of said sections at different times but at substantially the same position in relation to a predetermined frame of reference and the sequence is repeated at a first predetermined repetition frequency, processing means for comparing corresponding first and second echo pulses to substantially cancel those echo pulses relating to targets, which have not moved in relation to the frame of reference in the time elapsed between the emission of the corresponding first and second echo pulses, and to provide signals, at a second predetermined repetition frequency related to the first repetition frequency, indicative of the doppler frequency shift to the pulses relating to other targets and correlator circuit means arranged to correlate those of said signals lying within a specific total frequency band with a predetermined correlation function to provide indications of the positions of said other targets, wherein the said second repetition frequency is selected to be substantially equal to the spread of said specific total frequency band.

In order that the invention may be fully understood and readily carried into effect, it will now be described with reference to the accompanying drawings of which.

Figure 1:
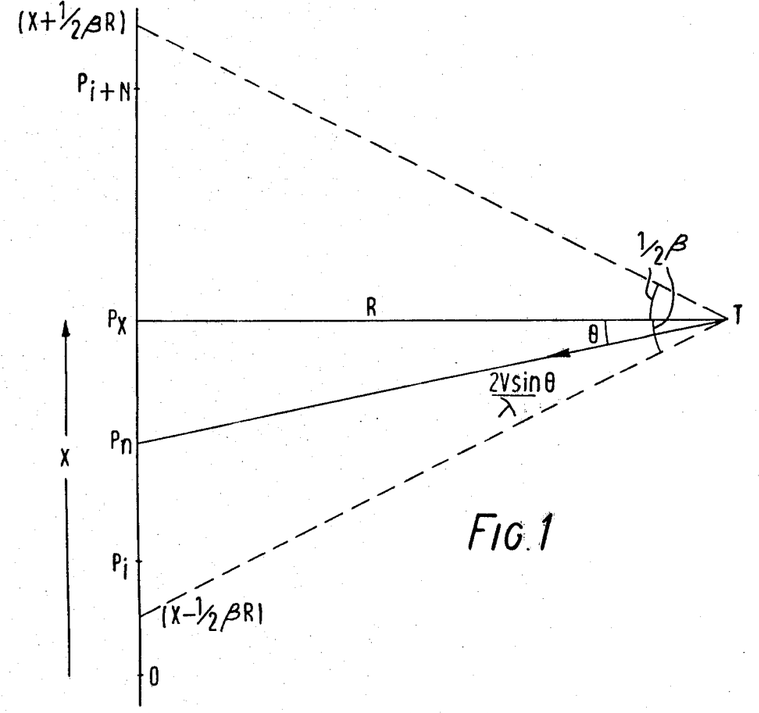
FIG. 1 shows a coordinate system used in explaining the principles of the invention.

Referring now to FIG. 1, consider an aeroplane carrying a radar transmitter and receiver, moving uniformly along a flight path O$x$, O being the origin of a coordinate distance $x$ along the path. A point target T situated to the right of the flight path subtends, at a point $P_x$, a normal of length R, $P_x$ being at a distance X from the origin O and R representing the range of the target. Considering the radar aerial to be located at a point $P(x)$ along the flight path and assuming the main lobe of the aerial directivity pattern to be disposed at an angle $\pm \frac{1}{2} \beta$ about the normal to the flight path at P, it will be apparent that the target T will provide radar returns to the aerial over a number of aerial positions P lying within a distance $\beta R$ along the flight path (for small values of $\beta$) i.e., for $$(X - \tfrac{1}{2} \beta R) \leq OP(x) \leq (X + \tfrac{1}{2} \beta R)$$

In practice N spaced returns are processed to provide signals indicative of returns from an aperture N sample positions wide, for example encompassing the points $P_i$ to $P_{i+N}$. This synthetic aperture is considered to be moved along the flight path at the velocity V of the aircraft, and corresponding groups of returns are successively processed to provide an output indicative of a radar map of the region to the right of the flight path.

Figure 2:
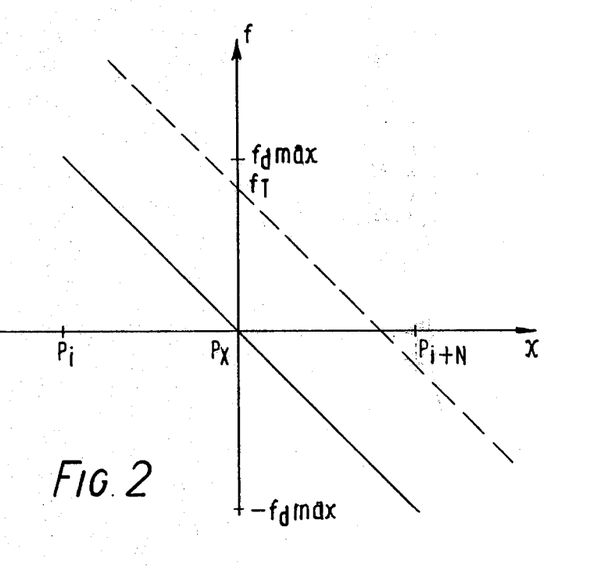
FIG. 2 shows the frequency excursions of radar returns from a point target across the synthetic aperture of radar apparatus according to the invention.

Considering a general aerial position $P_n$ in synthetic aperture $P_i$ to $P_{i+N}$ for the static point target T as shown in FIG. 1, then due to the relative motion between the target T and the aeroplane, the returns at the point $P_n$ will be imparted with a doppler shift of frequency $f_d$ where $$f_d = \frac{2V \sin \theta}{\lambda} \qquad (1)$$

where $\lambda$ represents the transmitter carrier wavelength, $\theta$ represents the angle subtended by the point $P_n$ at T and V represents the velocity of the aircraft relative to the ground. For small values of $\theta$, the doppler frequency imparted to the returns varies substantially linearly across the synthetic aperture for a given range cell as is shown in FIG. 2 as a solid line. Maximum doppler frequencies for a required along track resolution of $g$ are $+f_{d\ max}$ at point $P_i$ and $-f_{d\ max}$ at $P_{i+N}$, where $f_{d\ max} = V/2g$. The various returns which constitute the synthetic aperture are applied to correlating means such as a transversal filter as referred to before, and it will be apparent that the bandwidth of the correlator must be at least $2f_{d\ max}$ in order to process the returns to the required resolution. For correlating returns from static targets this bandwidth is centred on zero frequency.

Figure 3:
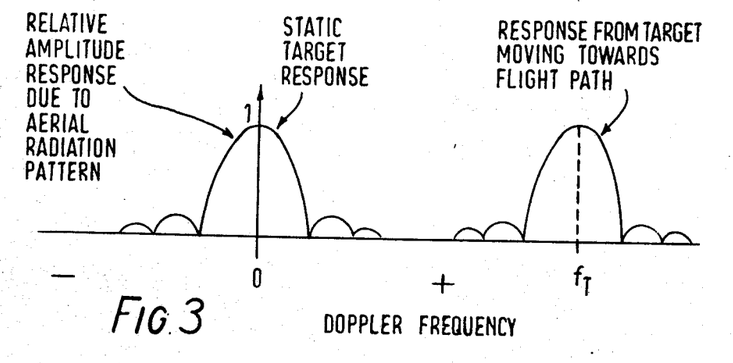
FIG. 3 shows, as a function of doppler frequency, the amplitude weighting due to the aerial radiation pattern of returns from both static and moving targets.

Considering now the target T to be moving with a velocity $v$ towards the flight path, then the returns at the point $P_n$ will be imparted with a further doppler component $$f_T = (2v/\lambda)\cos \theta$$

which for small values of $\theta$ is given by
$$f_T = 2v/\lambda \qquad (2)$$

and is substantially constant term across the synthetic aperture dependent on $v$. Thus a moving target gives a doppler frequency sweep as for a stationary target but shifted upwards by a frequency intercept $f_T$ as shown by a hatched line in FIG. 2. Thus although the range of the doppler returns from a moving target as it passes through the aerial beam is the same as for a stationary target the additional doppler frequency shift produced as a result of target motion causes the possible range of frequencies within which the doppler returns may fall to be much greater than for static targets alone. This is illustrated in FIG. 3 which shows amplitude of the received signal against frequency for a static target and for a target moving towards the flight path of the aircraft. The shapes of these amplitude responses are caused by the aerial radiation pattern. It will be understood that the returns from a target will be sensed at first through side lobes of that pattern when the return shows a high doppler deviation. As the aerial pattern side lobes are passed through in turn the amplitude of the return will exhibit successive maxima and minima corresponding to falling doppler frequency (c.f. FIG. 2) until the main aerial lobe is reached. Similarly, after the main aerial lobe is passed further amplitude maxima and minima will be seen, corresponding to the remaining aerial pattern side lobes. FIG. 3 shows these side lobe maxima and minima for the two targets referred to but is should be understood that only the central region of main aerial lobe reception is of significance in relation to the correlation processing.

The total doppler frequency band which would need to be covered in order to encompass all target velocities likely to be encountered in practice is substantially greater than the frequency range of a single correlator. However, taking account of the fact that, in practice, the radar transmitter is arranged to produce narrow pulses, the range which can be covered by a correlator is extended by making use of a phenomenon known as foldover or aliasing.

The doppler signals from any particular range cell may be considered as a continuous sinusoidal oscillation sampled at the pulse repetition frequency (PRF) with which they enter the correlator. Let this $PRF = f_s$. The spectrum of the sampled oscillation consists of a series of carrier oscillations of typical frequency $kf_s$, where $k$ assumes all integer values positive and negative. Each carrier has associated with it a pair of sideband oscillations, one either side and spaced from the carrier by the sampled oscillation frequency. The phenomenon known as aliasing occurs when the sampled oscillation frequency exceeds ½ $f_s$. In accordance with the phenomenon if a sampled oscillation has a frequency $f$, lying in the range $$\left[(\frac{2k-1}{2})f_s, \ (\frac{2k+1}{2})f_s\right]$$

then side bands will be present about the zero-frequency carrier of the sampling spectrum as though the sampled oxcillation were of frequency $f - kf_s$. Thus, for example, if $f_s = 3000$Hz a frequency of $+3200$Hz appears, after sampling, the same as a signal of $+200$Hz. Also $+2800$Hz signals alias to $-200$Hz and $-1600$Hz signals appear the same as $+1400$Hz signals. Thus, in order to detect a target which may be moving, relative to a reference frame such as the ground, only the frequency range $(-\frac{1}{2}f_s \rightarrow +\frac{1}{2}f_s)$ need be monitored in the correlation process. The relation between unsampled frequencies and the alias frequencies is obtained as described after sampling at frequency $f_s$ if both inphase and quadrature components of the frequency generating phasor are independently sampled.

In accordance with one example of the invention, sets of pulses are transmitted and received at congruent positions P on the flight path but which are spaced in time. These sets may be pulse pairs formed utilising an aerial of the type to be described hereinafter. The returns from the first pulse of the pair of transmitted pulses are stored until the returns from the second pulse are received whereupon the second returns are subtracted from the first returns. This cancellation process suppresses the doppler returns arising from stationary targets leaving only clutter and doppler returns from moving targets. It should be noted that in this case the frequency $f_s$ is the PRF of the pulses after cancellation, i.e. the repetition frequency of transmitted pulse-pairs.

Figure 5:
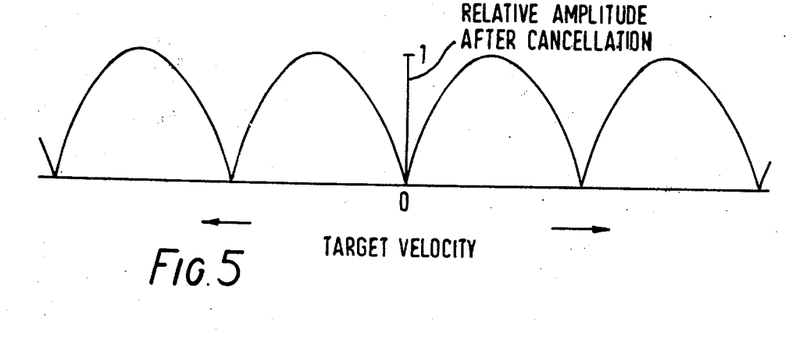
FIG. 5 shows the velocity response of a single delay canceller.

The cancellation process also gives an amplitude weighting to the subtracted signals according to the velocity of the target as shown in FIG. 5. The nulls in the response are related to the time interval between the pairs of pulses transmitted from congruent aerial positions. Since this time interval varies in inverse proportion to the aircraft velocity, resulting from the use of an aerial with fixed dimensions between its phase centres, then the nulls, or 'blind speeds' will vary directly with aircraft velocity.

Thus the signals emerging from the cancellation process at a range of $f_s$ will have an amplitude weighting with target velocity according to FIG. 5 and will also have a further amplitude weighting with doppler frequency, determined by the position of the target in the aerial beam, as shown for a typical target in FIG. 3. The frequency range covered by the doppler returns will, as a result of forming alias frequencies, appear to lie in the frequency range $+f_s/2$ to $-f_s/2$. They may, therefore, be processed by any combination of correlators able to effectively cover that frequency range.

However, in accordance with an example of this invention, to process the returns from a moving target to the required resolution the correlator is arranged to cover a frequency range of $2 F d\ max$ centred on $f_K$ where $f_K$ is made equal to $f_s/2$.

Figure 4:
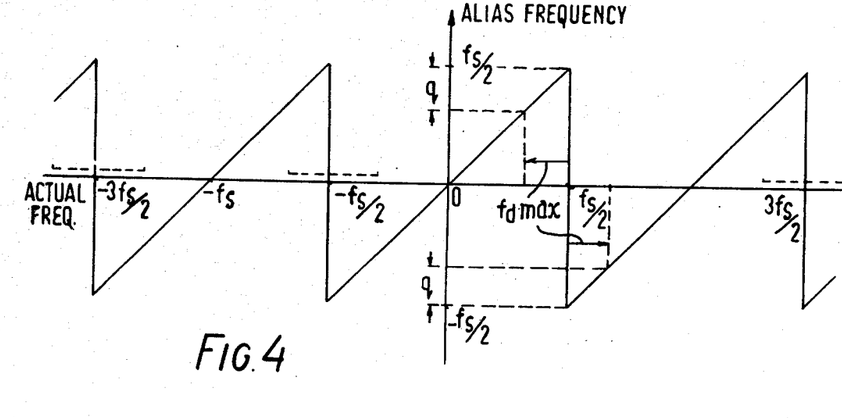
FIG. 4 shows a plot of alias frequency against actual frequency sampled at frequency $f_s$.

FIG. 4 is a graph which relates the actual received doppler frequency, on the horizontal axis, with the alias frequency formed in the range $-f_s/2 < 0 < f_s/2$. Thus it can be seen that frequencies in the range $(f_s/2 - f_{dmax}) \rightarrow f_s/2$ have alias frequencies in the range $(f_s/2 - q) \rightarrow f_s/2$ and those in the range $f_s/2 \rightarrow (f_s/2 + f_{dmax})$ have alias frequencies in the range $-f_s/2 \rightarrow (-f_s/2 + q)$. Similarly frequencies in the other ranges, indicated by the broken lines on the horizontal axis, have alias frequencies also in the ranges labelled $q$. Therefore the correlator centred as $f_s/2$ will process sidebands about the frequency related to signals in a series of ranges of $\pm 2 f_{dmax}$ centred on frequencies $$\frac{(2n + 1)}{2} f_s$$

where $n$ is an integer. It is thus equivalent to a series of correlators each having such a range and centred on one of those frequencies.

It will be apparent from FIG. 4 that other combinations and dispositions of the correlator frequency range will achieve a multiplicity of frequency bands capable of being processed by the correlator arrangement. For example the correlator may be centred around any of the frequencies $$\frac{(2n + 1)}{2} f_s \pm \Delta$$

where $0 \leq \Delta \leq f_{d\ max}$. However optimum results will be obtained with the correlator centred on $f_s/2$ as previously described, since returns from clutter, having frequencies in the region of zero frequency, will be largely outside the operating frequency range of the correlator; the unwanted clutter response is therefore considerably attenuated; also the same response is given to targets having the same velocity regardless of whether they are moving towards or away from the aircraft track.

Consider now a target moving with a velocity $v_T$ such that, from equation 2, $$v_T = \frac{\lambda}{2} f_T = \frac{\lambda f_s}{4} \text{ if } f_T = \frac{f_s}{2}.$$

Such a target will produce its peak amplitude when lying on the axis of symmetry of the aerial beam at a doppler frequency of $+f_s/2$ or $-f_s/2$ depending on whether it is moving towards or away from the aircraft track.

Considering again the correlator with a range of $2f_{d\ max}$ centred on $f_K = f_s/2$. The frequency with which cancelled signals emerge from the canceller, i.e. $f_s$, is chosen to be approximately equal to the change of doppler frequency of returns from static targets passing between the half power points of the aerial radiation pattern, i.e. within the angle $\pm \frac{1}{2}$. This ensures that the doppler frequency excursion of the returns across the aperture covers at least part of the range of the correlator for targets having a velocity $v$ in the range $0 < v < v_T$.

Figure 6:
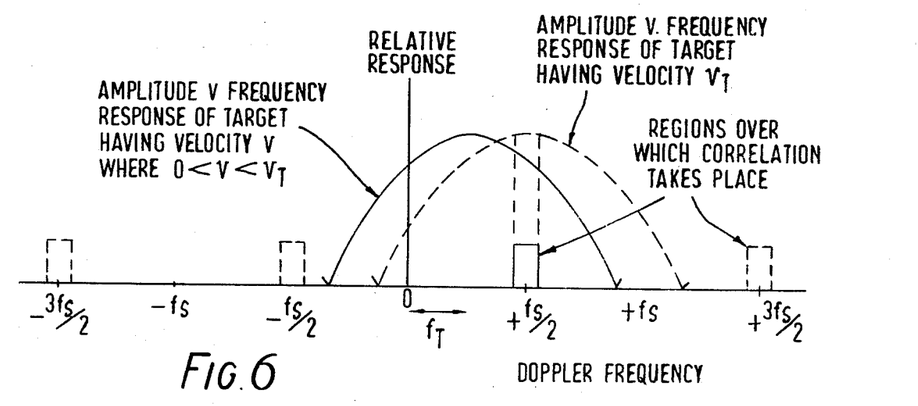
FIG. 6 shows amplitude doppler frequency responses from moving targets in relation to correlation frequency bands.

Although the frequency excursions of such returns may not be centred on $f_K = f_s/2$ the frequency range thereof will overlap that of the correlator. This is shown in FIG. 6. Thus the correlator will still correlate a portion of the returns providing an indicatiion of a moving target but which is displaced from its actual position and is of diminished amplitude. This, however, gives substantially no loss of resolution. For $v > v_T$ it may happen that there is no useful response in the frequency region centred on $f_s/2$. However due to the aliasing properties of the sampled returns the correlator will process returns having frequencies in regions centred on values of $f_K$ given by $$f_K = \frac{(2n + 1)}{2} f_s .$$

Frequency excursions from moving target returns having ranges which overlap one of these regions will be correlated as though they overlapped the correlation region centred on $f_K = f_s/2$ and thus will be correlated by the single correlation means.

Figure 7:
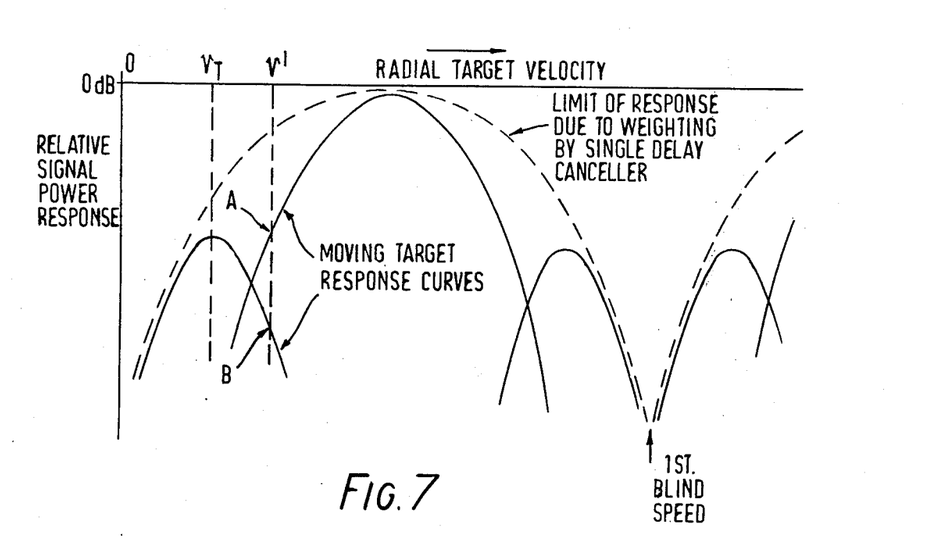
FIG. 7 shows a typical normalized overall system response.

A plot of the overall correlator response is given, for a typical system, as shown in FIG. 7, normalized to the response of a correlator to a signal not limited by the cancellation weighting of FIG. 5. That weighting is also shown by the hatched curve. The figure shows only the response curves for targets moving towards the aircraft track and would be symmetrical about the origin for targets moving away from the aircraft track. The curves give the response of the correlator to any target of the velocity shown including the effects of all the relevant weightings hereinbefore described. Thus a target of velocity $v_T$ will give an output as indicated.

For a target moving within certain ranges of velocity it may happen that the range of doppler frequencies produced as it traverses the whole of the aerial beam will include, when aliasing effects are considered, two separate correlation frequency bands. In these circumstances two distinct indications in different parts of the aerial beam will be given for that target. This is shown in the figure for a target with velocity $v'$, which gives two outputs of different amplitude as shown at A and B.

Figure 8:
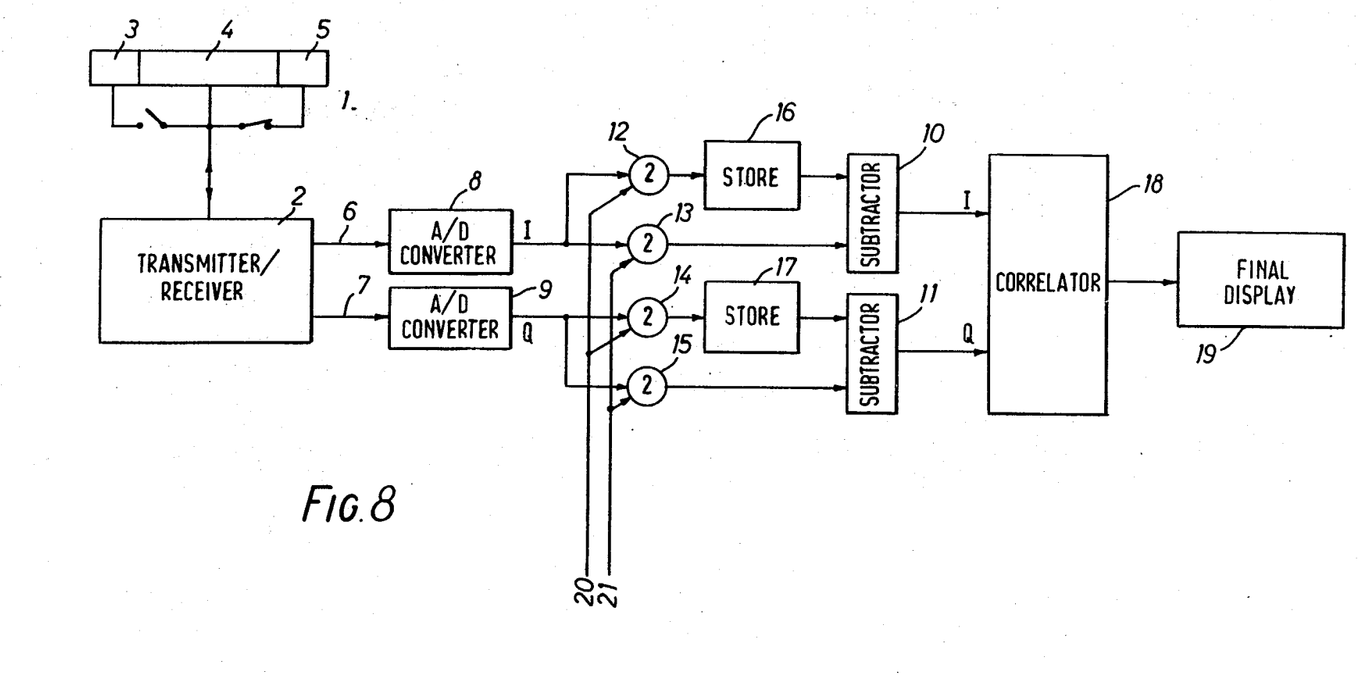
FIG. 8 shows in block diagrammatic form, a circuit arrangement of an example of radar apparatus according to this invention.

FIG. 8 shows a practical implementation of a moving target indicator radar according to this invention utilising the principles elucidated above. An aerial of the type referred to hereinbefore is shown generally at 1 mounted in a sideways looking position on an aircraft and is connected to a transmitter/receiver unit 2. The aerial comprises three aperture sections 3, 4 and 5, sections 3 and 5 being of equal length. The receiver is arranged to give in-phase and quadrature outputs on lines 6 and 7 respectively, defining the phase of each return, these signals being applied to a respective analogue to digital converter (8 and 9). The outputs of the converters are each applied in pairs to a respective subtractor unit 10 or 11, under the control of "and" gates 12 to 15; stores 16 and 17 are arranged to store signals derived from one return such that signals indicative of pairs of returns can be applied in tandem to a correlator means 18. The correlator means 18 in this example of the invention comprises a surface acoustic wave delay line of the type described in U.S. Application Ser. No. 408,503 which provides output signals indicative of, in this case, points on a map of a region to the side of the aircraft flight path indicating regions of movement therein. The output signals are stored and displayed in display means 19.

In operation, if the aircraft is flying from right to left in FIG. 8, the aerial is arranged to transmit a pulse and receive corresponding first return utilising aerial elements 3 and 4. A short time later, due to the aircraft movement aerial elements 4 and 5 take up, in combination a congruent position to elements 3 and 4. A second transmitter pulse and a corresponding second return are transduced utilising elements 4 and 5. The first return is processed by the receiver 2 to form video signals in phase on lines 6 and 7, and the digital signals indicative thereof from converters 8 and 9 are applied to stores 16 and 17 respectively under control of a 1 pulse on line 20. The second return is similarly processed but the digital signals derived therefrom are directed in tandem with the outputs of stores 16 and 17 to the subtractors 10 and 11 by means of a 1 pulse on line 21.

The transmitter 2 is arranged to transmit and receive the next pulse using aerial elements 3 and 4 after a time of $1/f_s$ seconds following the previous use of elements 3 and 4. The fourth pulse in the sequence is transmitted when elements 4 and 5 of the aerial again take up a congruent position to elements 3 and 4. The subtractors therefore provide subtractor output signals at a rate $f_s$ to the correlator means.

A series of subtractor output signals are applied to phase modulate a carrier wave at a data rate $p'\alpha \sqrt{R}$ for the range cell to be investigated. The carrier wave is chosen to have a centre frequency $f_s/2$, and when modulated by the returns, is applied to a transversal filter as hereinbefore referred to. By choosing a carrier frequency of $f_s/2$, the bandwidth of the correlator is centered about $f_s/2$ and thus the correlator is equivalent to a series of correlators having bandwidths centered on $$\frac{(2n+1)}{2} f_s ,$$

the correlation having a response to moving targets substantially as shown in FIG. 7. Instead of using a correlation procedure incorporating a transversal filter, alternative procedures such as that described in U.S. Application Ser. No. 476,996 may be used. Clutter may be produced in the output of the subtractors 10 and 11, due to slight movement of cancelled "static" targets, having a substantially Gaussian frequency distribution centred on zero frequency. However, since the bandwidth of the correlator 18 lies substantially outside the range of this distribution, this example of the invention provides a good signal to clutter ratio.

Figure 9:
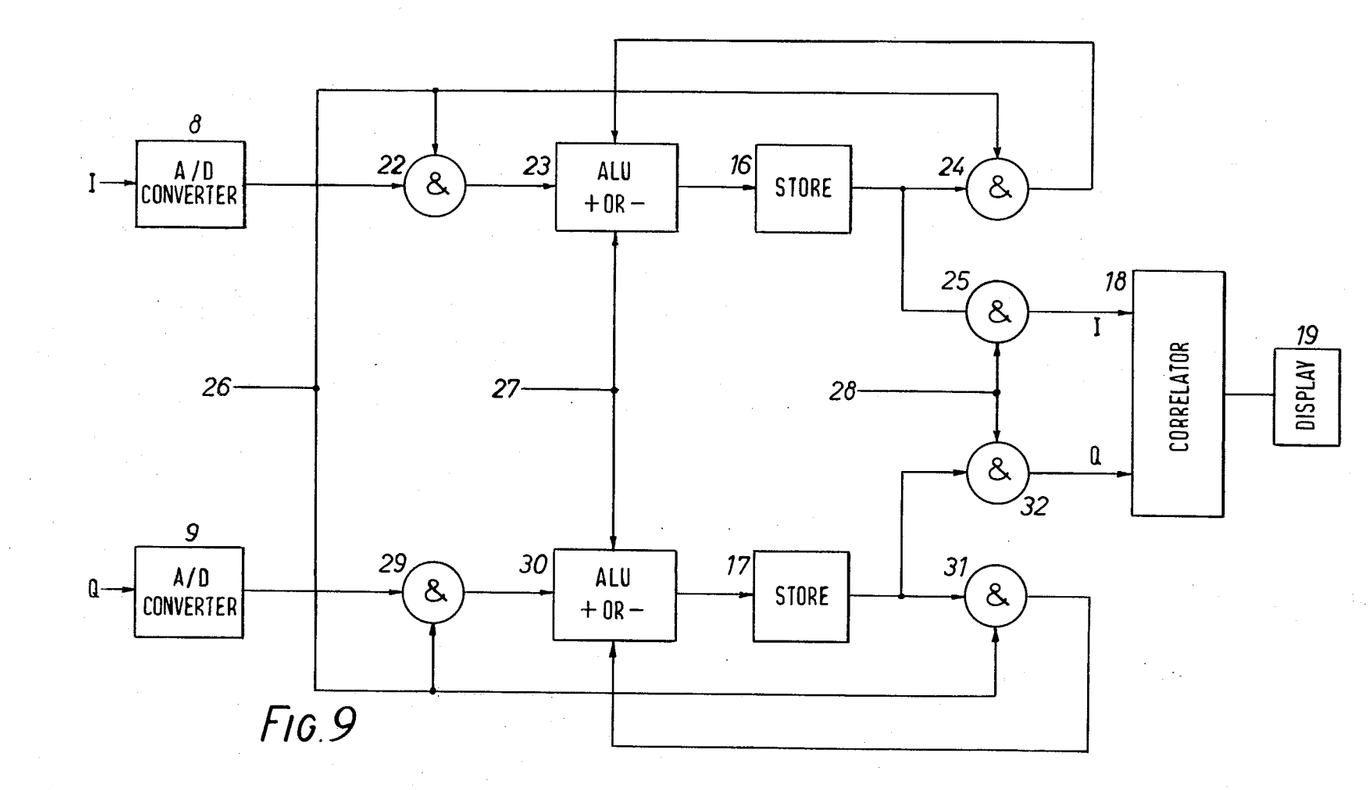
FIG. 9 shows in block diagrammatic form, a circuit arrangement of a modification to the example of radar apparatus according to this invention.
Figure 10:
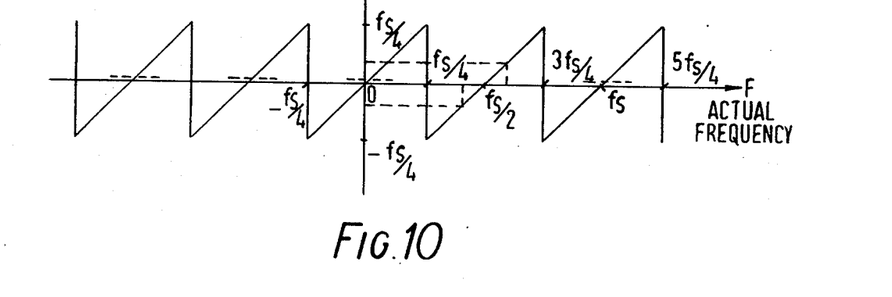
FIG. 10 shows a plot of alias frequency against actual frequency sampled at frequency $f_s/2$.
Figure 11:
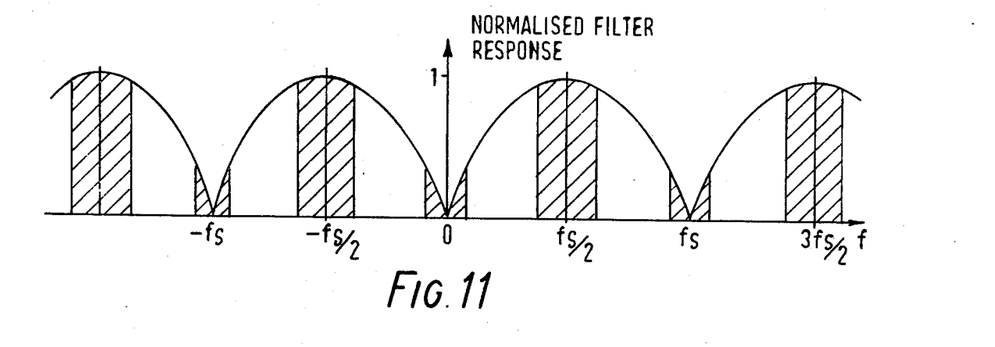
FIG. 11 shows the filter response of a modification to the example of radar apparatus according to this invention.

In order to reduce the data to be processed by the correlator, successive pairs of subtractor output signals from subtractors 10 and 11 may be applied to a similar pair of subtractors. Alternatively an arrangement such as shown in FIG. 9 may be used to further reduce data storage requirements. In this arrangement signals from the Analogue to Digital Converters 8, 9 are passed through AND-gates 22, 29 when permitted by control input 26 to Arithmetic Logic Units (ALUs) 23, 30. The ALUs will add or subtract two digital numbers as determined by the control input 27. The result of the addition or subtraction is passed to the stores 16, 17. When the next series of outputs are obtained from the A/D converters the signals in stores 16, 17 are simultaneously transferred to the second data input of the ALUs via AND-gates 24, 31. The ALUs are arranged to add the signal on the first data input to, or subtract it from, that on the second data input in the sequence +, −, −, +. The operation will be described for four signals in sequence, $a$, $b$, $c$ and $d$, where $a$, $b$ and $c$, $d$ are pairs relating to congruent aerial positions as hereinbefore described. Assuming that the stores 16 and 17 have been cleared the ALUs add signal $a$ to zero and pass the result to the stores. The next signal, $b$, is then subtracted from the contents of the stores, returned via AND gates 24 and 31, to give a-b, which is input into the stores. Similarly the next signal, $c$, is subtracted to give a-b-c and the last, $d$, is added, to give a-b-c+d. It will be seen that the final result in the stores is equivalent to $(a-b)-(c-d)$ which would be the output given by a further pair of subtractors added to the circuit of FIG. 8. At the end of this sequence gates 22, 24, 29, 31 are closed to permit the stores to be set to zero and gates 25, 32 opened to permit the transfer of data to the correlator or intermediate storage means. This transfer and resetting may be carried out simultaneously with the arrival of the first pulse of the next sequence in the ALUs. In that case, although gates 22 and 29 may be open to permit the entry of the new pulse, gates 24 and 31 must be closed to prevent recirculation of the existing contents of the stores and to thus ensure that the first pulse is added to zero. Since data are now only input to the correlator once for every two congruent pairs the arrangement of FIG. 9 samples at a rate $f_s/2$ instead of $f_s$. Consequently the effect of aliasing on the sampled doppler returns is modified from that shown in FIG. 4 to that shown in FIG. 10. This process of data reduction also gives a frequency dependent amplitude weighting to the signal before correlation as shown in FIG. 11. Because the correlator is now sampling its input signals at a rate of $f_s/2$ the single correlator means centred on $f_s/2$ is equivalent to a series of correlators whose centre frequencies are spaced apart by a frequency interval of $f_s/2$. Thus a correlator centred on $f_s/2$ now processes aliased signals from the side bands of the zero frequency carrier, so that clutter signals are now no longer largely excluded from the operating frequency band of the correlator. However, because of the canceller filtering action illustrated in FIG. 11 and the placing of the correlator in relation to this is shown by the hatched regions, the overall system output is much reduced for the correlation outputs related to returns centred on zero frequency and frequencies of $nf_s$. It is also possible to centre a correlation of $f_s/4$ to obtain a series of correlation regions which largely exclude the clutter spectrum around zero frequency but the filter characteristic shown in FIG. 11 indicates that an equal but diminished response would be given for each of the then resultant correlation bands at $f_s/2$ spacing and that therefore there is no advantage to be gained in performing the second subtraction process over simply sampling the canceller output at $f_s/2$. However it will be appreciated that with the sampling rate at $f_s/2$ the correlator may actually be centred on zero frequency to give an identical output to that discussed, centred on $f_s/2$. This allows commonality with non-MTI correlators, arranged merely to give a map output for stationary targets in the region, since these are generally centred on zero frequency.

The examples of the apparatus described with reference to FIG. 8 and FIG. 9 may be included in a moving vehicle such as an aircraft. However video signals which are not fully processed may be recorded on a suitable medium such as magnetic tape for subsequent application to a correlator located on the ground.

What I claim is:

1. A synthetic aperture radar system for surveying a region from a moving location including an aerial having a plurality of space sections, a transmitter adapted to cooperate with said aerial to project a series of emitted pulses towards said region, a receiver adapted to cooperate with said aerial to receive corresponding echo pulses relating to targets in said region, the arrangement being such that a first emitted pulse is projected from, and corresponding first echo pulses are received at, at least one of said sections, a second emitted pulse is projected from, and corresponding second echo pulses are received at, at least one other of said sections at different times but at substantially the same position in relation to a predetermined frame of reference and the sequence is repeated at a first predetermined repetition frequency, processing means for comparing corresponding first and second echo pulses to substantially cancel those echo pulses relating to targets, which have not moved in relation to the frame of reference in the time elapsed between the emission of the corresponding first and second echo pulses and to provide signals at a second predetermined repetition frequency related to the first repetition frequency, indicative of the doppler frequency shift of the pulses relating to other targets and correlator circuit means arranged to correlate those of said signals lying within a specific total frequency band with a predetermined correlation function to provide indications of the positions of said other targets, wherein the said second repetition frequency is selected to be substantially equal to the spread of said specific total frequency band.

2. A radar system according to claim 1 wherein said processing means is arranged such that the second repetition frequency is less than said first repetition frequency.

3. A radar system according to claim 1 wherein said correlator means is constituted by a single correlator operative over the whole of said specific frequency band.

4. A radar system according to claim 3 wherein the centre frequency of the bandwidth of said correlator is located at or in the vicinity of one of the frequencies $(2n + 1)f_s/2$ where $n$ is an integer and $f_s$ is equal to said first predetermined repetition frequency.

* * * * *